United States Patent Office 3,739,032
Patented June 12, 1973

3,739,032
PROCESS FOR THE PREPARATION OF
UNSATURATED ETHERS
Friedrich Wunder, Florsheim (Main), Germany, assignor to Farbwerke Hoechst Aktiengesellschaft vormals Meister Lucius & Bruning, Frankfurt am Main, Germany
No Drawing. Filed Nov. 16, 1970, Ser. No. 90,075
Claims priority, application Germany, Nov. 17, 1969,
P 19 57 680.8
Int. Cl. C07c 41/00
U.S. Cl. 260—614 R    10 Claims

ABSTRACT OF THE DISCLOSURE

This invention relates to a process for the preparation of unsaturated ethers by splitting acetals at elevated temperature in the gaseous phase in the presence of supported catalysts containing a noble metal, in which process alkali metal or alkaline earth metal carboxylates in an amount of from 1 to 30% by weight are added to the catalysts to obtain an increase in yield.

The present invention relates to a process for the preparation of unsaturated ethers.

It is known from German Pat. No. 525,836 that acetals may be split to yield ethers and alcohols at elevated temperature in the gaseous phase. As catalysts, there are used clay, alumosilicates and, especially, noble metals of the first or eighth group of the Periodic Table as well as ferrous metals on carrier materials. However, with the hitherto known processes, the yields and extents of conversion are too poor for economic use.

The present invention provides a process for the preparation of unsaturated ethers by splitting acetals at elevated temperature in the gaseous phase on supported catalysts containing noble metals, in which the catalysts contain in addition to the noble metals also alkali metal or alkaline earth metal carboxylates in amounts of from 1 to 30% by weight, preferably from 3 to 10% by weight, based on the system consisting of carrier material and active substances.

It was very suprising and could not be foreseen that the addition of alkali metal or alkaline earth metal carboxylates to the known catalysts brings about such a great increase in yield as from 62 to 89%. It could not be foreseen, either, that the use of the catalysts known from German Pat. No. 525,836 leads to a further increase in yield up to 99%, if these catalysts are used in combination with one another and not individually.

Suitable alkali metal or alkaline earth metal carboxylates are, for example, those of lithium, sodium, potassium, rubidium, magnesium, calcium, strontium and barium. However, carboxylates of sodium and potassium are preferably used. The carboxylate radical is not very important, for example, acetates, propionates, butyrates or benzoates may be used, however, the carboxylate ion should be stable under the reaction conditions. Acetates and propionates are preferably used.

Noble metals are, for example, silver, gold, palladium and platinum, however, the combination of a noble metal of the first group with a noble metal of the eighth group of the Periodic Table, for example, gold/palladium, is preferably used. The amounts of noble metal applied to the catalyst are within the range of from 0.1 to 20%, preferably from 0.5 to 5%, calculated on the system consisting of carrier material and active substances. The weight ratio of the two noble metals is within the range of from 1:10 to 1:1, preferably from 1:1 to 1:5, the noble metal of the eighth group being, in general, predominant.

The carrier material generally used for the catalysts is, for example, ceramic compositions, silicic acids, alumosilicates, aluminum oxides, active carbons, titanium oxide or titanates, zircon and other inert materials.

The catalysts are prepared in known manner, for example, by applying a solution of the two noble metals to the carrier material and by subsequent reduction in the liquid phase by means of hydrazine hydrate or after drying in the gaseous phase with hydrogen. Subsequently, the solution of an alkali metal or alkaline earth metal carboxylate is applied and then dried. However, the noble metals may also be applied to the carrier material, for example, as acetates together with the alkali metal or alkaline earth metal acetates from an acetic acid solution and reduced under the reaction conditions by means of the reaction products; in the case of methyl vinyl ether reduction is carried out by the methanol obtained.

Suitable reactants are acetals or ketals of aliphatic, aromatic, araliphatic aldehydes and ketones which may be vaporized without decomposition under atmospheric or reduced pressure; especially suitable are the low acetals having up to 6 carbon atoms in the aldehyde or alcohol part, for example, dimethyl acetaldehyde acetal, acetal (diethyl acetaldehyde acetal), diisobutyl acetaldehyde acetal, dimethyl ketal, propionic aldehyde dimethylacetal, butyric aldehyde dimethylacetal, acetophenone diethylacetal, glycolacetal, neopentyl glycolacetal and glycol-monoethyl ether acetaldehyde acetal.

The reaction is advantageously carried out at a temperature within the range of from 100° to 450° C., preferably from 200 to 350° C. The reaction pressure which is generally within the range of from 0 to 5 atmospheres gage, preferably from 0.5 to 1.5 atmospheres gage, is so low that the acetals are not condensed under the reaction conditions. The residence period is within the range of from 1 to 50 seconds, preferably from 10 to 30 seconds.

The effect of the process in accordance with the invention is shown in the following table, in which methyl vinyl ether is taken as an example:

| Catalyst | Yield, percent | Extent of conversion, percent | Composition of the reaction product after separation of methanol and dimethyl acetal | | |
|---|---|---|---|---|---|
| | | | Methyl vinyl ether, percent | Dimethyl ether, percent | Methyl ethyl ether, percent |
| 1% Pd on SiO$_2$ | 62 | 51 | 68.9 | 23.1 | 7.9 |
| 1% Pd, potassium acetate on SiO$_2$ | 89 | 58 | 89.6 | <0.1 | 10.3 |
| 1% Pd, 0.4% Au, 6% potassium acetate on SiO$_2$ | 99 | 78 | 99.9 | <0.1 | <0.1 |

The reaction was carried out under the following conditions: 300° C., 1 atmosphere gage, residence period: 20 seconds, charge of catalyst: 375 milliliters in a reaction tube of a diameter of 30 millimeters, reaction time: 8 hours.

The unreacted acetal and the alcohol obtained in the reaction may be used again or may effect the formation of acetal so that a cycle of the unreacted products is obtained.

The unsaturated ethers prepared according to the invention are valuable monomers for the polymerization yielding adhesives and synthetic materials.

COMPARISON EXAMPLE 115 grams of dimethyl acetaldehyde acetal per hour were passed, at 300° C. under atmospheric pressure, over 375 milliliters of a catalyst consisting of 1% of palladium supported on a commercial carrier of silicic acid and the reaction products were condensed at −78° C. in a cooling trap. A brown reaction product of from 114 to 115 grams per hour was obtained which contained:

49% of acetaldehyde dimethyl acetal
20.3% of methyl vinyl ether
6.9% of dimethyl ether
2.4% of methyl ethyl ether
15.4% of methanol the remainder being water and brown condensation products. The corresponding result is an extent of conversion of 51%, a yield of 62% and a space-time yield of 62.5 g./l.h.

EXAMPLE 1

Under the same conditions as in the comparison example, but using a catalyst which contained in addition to 1% of palladium also 6% of potassium acetate, a colorless reaction product was obtained containing 42% of acetaldehyde dimethyl acetal
33.6% of methyl vinyl ether
3.7% of methyl ether ether
20.7% of methanol which corresponds to an extent of conversion of 58%, a yield of 89% and a space-time yield of 103 g./l.h.

EXAMPLE 2

Under the same conditions as in Example 1 and using a catalyst consisting of 1% of palladium, 0.4% of gold and 6% of potassium acetate supported on a carrier of silicic acid, a colorless reaction product was obtained consisting of 12.8% of acetaldehyde dimethyl acetal
59.4% of methyl vinyl ether
27.8% of methanol which corresponds to an extent of conversion of 78%, a yield of 99% and a space-time yield of 181 g./l.h.

By simple distillation of this reaction product via a column 1.3 meters long and having a reflux ratio of 1:1, the desired methyl-vinyl ether of a purity of 99.9% was obtained without taking first-runnings.

What is claimed is:

1. In a process for making an unsaturated ether by splitting an acetal selected from the group consisting of lower alkyl acetals wherein the alkyl and alkoxy groups may each contain up to 6 carbon atoms, at a temperature of 100° to 450° C. in the gaseous phase in the presence of a supported catalyst containing a noble metal, the improvement which comprises using a supported catalyst system containing, in addition to a catalytic amount of a noble metal, from 1% to 30% by weight of said catalyst system of a compound selected from alkali metal and alkaline earth metal acetates, propionates, butyrates and benzoates.

2. A process as claimed in claim 1 in which the alkali metal or alkaline earth metal acetates used are sodium and/or potassium acetate.

3. A process as claimed in claim 1, in which the alkali metal or alkaline earth metal acetates or propionates are used.

4. A process as claimed in claim 1, in which the reaction is carried out at a temperature within the range of from 200° to 350° C.

5. A process as claimed in claim 1, in which the reaction is carried out at a pressure up to 5 atmospheres gage.

6. A process as claimed in claim 1, in which the reaction is carried out at a pressure within the range of from 0.5 to 1.5 atmospheres gage.

7. A process as claimed in claim 1, in which the reaction is carried out at residence times within the range of from 1 to 50 seconds.

8. A process as claimed in claim 1, in which the reaction is carried out at residence times within the range of from 10 to 30 seconds.

9. In a process for making an unsaturated ether by splitting an acetal selected from the group consisting of lower alkyl acetals wherein the alkyl and alkoxy groups may each contain up to 6 carbon atoms, at a temperature of 100° to 450° C. in the gaseous phase in the presence of a supported catalyst containing a noble metal, the improvement which comprises using a supported catalyst system containing from 0.1% to 20% by weight of said catalyst system of a combination of noble metals, one of which is selected from the first group of the Periodic Table and another of which is selected from the eighth group of the Periodic Table, and from 1% to 30% by weight of said catalyst system of a compound selected from alkali metal and alkaline earth metal acetates, propionates, butyrates and benzoates.

10. A process according to claim 9 wherein said noble metals are gold and palladium.

References Cited

UNITED STATES PATENTS

| | | | |
|---|---|---|---|
| 1,931,858 | 10/1933 | Baur | 260—614 R |
| 2,479,068 | 8/1949 | Gresham | 260—615 R |
| 2,566,415 | 9/1951 | Hoaglin et al. | 260—614 R |

HOWARD T. MARS, Primary Examiner

U.S. Cl. X.R.

210—611 A, 615 R; 260—632 B